US006276039B1

United States Patent
Barnes

(10) Patent No.: US 6,276,039 B1
(45) Date of Patent: Aug. 21, 2001

(54) CLAMP ASSEMBLY FOR LIMITING MOVEMENT OF A CUTTING BLADE ON A LAWN MOWER ASSEMBLY AND METHOD OF USING THE CLAMP ASSEMBLY

(76) Inventor: Susan M. Barnes, 7541 Edwardsville Rd., Rockford, IL (US) 61102

( * ) Notice: Subject to any disclaimer, the term of this patent is extended or adjusted under 35 U.S.C. 154(b) by 0 days.

(21) Appl. No.: 09/354,124

(22) Filed: Jul. 15, 1999

(51) Int. Cl.[7] ........................................................ B23P 6/00
(52) U.S. Cl. ............................... 29/402.05; 29/402.03; 29/402.04; 29/402.06; 56/229; 56/289
(58) Field of Search ........................... 29/402.05, 402.03, 29/402.04, 402.06, 426.1, 426.5; 56/229, 233, 237, 257, 289, 302, 305

(56) References Cited

U.S. PATENT DOCUMENTS

| D. 334,271 | 3/1993 | Ellis . |
|---|---|---|
| 3,173,234 | 3/1965 | Vodineich . |
| 3,617,044 | 11/1971 | Strange . |
| 4,208,859 | 6/1980 | Brockway . |
| 4,238,123 | 12/1980 | Bardes . |
| 4,564,991 | 1/1986 | Taylor . |
| 4,747,588 | 5/1988 | Dillhoff . |
| 4,882,960 | 11/1989 | Kugler . |
| 4,956,905 | 9/1990 | Davidson . |
| 5,143,359 | 9/1992 | Bush . |
| 5,322,396 | 6/1994 | Blacker . |
| 5,460,461 | 10/1995 | McGrath . |
| 5,676,500 | 10/1997 | Sommerfield . |
| 5,865,018 | 2/1999 | Wanie . |

Primary Examiner—P. W. Echols
Assistant Examiner—John C. Hong
(74) Attorney, Agent, or Firm—Wood, Phillips, VanSanten, Clark & Mortimer

(57) ABSTRACT

The combination of a lawn mower assembly and a clamp assembly. The lawn mower assembly has a housing defining a cutting chamber, a shaft journalled for rotation in the housing around an axis, and a cutting blade that is selectively a) releasably attached to the shaft to rotate with the shaft in a predetermined path around the shaft axis and b) separable from the shaft as to facilitate reconditioning or replacement of the cutting blade. The clamp assembly includes a first jaw having a first surface and a second jaw having a second surface. The second jaw is movable relative to the first jaw between i) a first relative position wherein the first and second surfaces are spaced from each other a first distance and ii) a second relative position wherein the first and second surfaces are spaced from each other a second distance that is less than the first distance. The second jaw is movable relative to the first jaw between the first and second relative positions by guided movement of the second jaw relative to the first jaw. One of the first and second jaws has a blocking surface thereon. The clamp assembly can be situated in an operative position on the lawn mower assembly wherein, with the second jaw in the second relative position, the first and second jaws captively, grippingly engage the housing and the blocking surface resides in the predetermined path of the cutting blade to thereby prevent free rotation of the cutting blade relative to the housing.

20 Claims, 3 Drawing Sheets

CLAMP ASSEMBLY FOR LIMITING MOVEMENT OF A CUTTING BLADE ON A LAWN MOWER ASSEMBLY AND METHOD OF USING THE CLAMP ASSEMBLY

BACKGROUND OF THE INVENTION

1. Field of the Invention

This invention relates to lawn mowers of the type having a housing with a cutting blade mounted on a shaft journalled for rotation in the housing and, more particularly, to a clamp assembly which can be used to limit rotation of the cutting blade, as to facilitate safe handling of the blade during assembly, disassembly and reconditioning thereof. The invention is also directed to a method of using the clamp assembly.

2. Background Art

Elongate cutting blades are used on a wide range of lawn mowing equipment. One typical lawn mower construction utilizing an elongate blade has a fixed housing mounted on wheels and manipulated through a push-type handle. The housing defines a cutting chamber within which a cutting blade is mounted. The cutting blade is mounted on a shaft which is journalled for rotation in the housing.

In another construction, decks, with one or more cutting blades, are mounted on a vehicle, such as a tractor. The deck has a housing with at least one chamber for a cutting blade. On decks having multiple blades, typically each cutting blade is mounted upon a shaft on the housing that projects upwardly therethrough to allow a pulley to be mounted on the shaft. One or more belts can be used to engage the pulleys and simultaneously drive the shafts and the cutting blades thereon.

Periodically, cutting blades need to be accessed to effect removal and/or reconditioning thereof. In a typical blade mount, the shaft has an enlarged fitting on the end which accommodates one or multiple bolts. A blind bore on the fitting has an axis that is coincident with the rotary axis for the shaft. Two diametrically opposite through bores are provided to accept a like number of bolts to prevent rotation of the blade relative to the fitting around the shaft axis.

There are a number of dangers associated with cutting blade maintenance. The cutting blade is free to rotate about the shaft axis during this maintenance. By attempting to tighten or loosen the mounting bolts, an individual may inadvertently rotate the cutting blade around the axis of the shaft. This could cause inadvertent and harmful contact between the cutting blade and the individual.

Often, individuals securing or removing a cutting blade may directly grasp the cutting blade with one hand while manipulating a wrench with the other hand. A torque exerted, principally upon the center bolt which coincides with the shaft axis, tends to rotate the shaft and the cutting blade. If the user exerts a substantial torque on the wrench, the hand holding the blade may be cut thereby.

Aside from the physical dangers, the individual holding the blade may not be able to hold the blade with sufficient force to allow the bolts to be properly tightened or loosened.

A more serious problem is that a torque applied to the cutting blade may cause inadvertent ignition of the engine driving the cutting blade, with potentially severe consequences.

To address these problems, various mechanisms have been devised for limiting rotation of a cutting blade relative to a deck/housing. Examples of these structures are shown in each of U.S. Pat. Nos. 4,564,991 (Taylor); 4,208,859 (Brockway); 5,865,018 (Wanie); 3,173,234 (Vodinelich); and 4,882,960 (Kugler).

In U.S. Pat. No. 4,956,905 (Davidson) a structure is shown for allowing a user to exert a force to limit rotation of the cutting blade without directly contacting the cutting blade.

SUMMARY OF THE INVENTION

In one form, the invention is directed to the combination of a lawn mower assembly and a clamp assembly. The lawn mower assembly has a housing defining a cutting chamber, a shaft journalled for rotation in the housing around an axis, and a cutting blade that is selectively a) releasably attached to the shaft to rotate with the shaft in a predetermined path around the shaft axis and b) separable from the shaft as to facilitate reconditioning or replacement of the cutting blade. The clamp assembly includes a first jaw having a first surface and a second jaw having a second surface. The second jaw is movable relative to the first jaw between i) a first relative position wherein the first and second surfaces are spaced from each other a first distance and ii) a second relative position wherein the first and second surfaces are spaced from each other a second distance that is less than the first distance. The second jaw is movable relative to the first jaw between the first and second relative positions by guided movement of the second jaw relative to the first jaw. One of the first and second jaws has a blocking surface thereon. The clamp assembly can be situated in an operative position on the lawn mower assembly wherein, with the second jaw in the second relative position, the first and second jaws captively, grippingly engage the housing and the blocking surface resides in the predetermined path of the cutting blade to thereby prevent free rotation of the cutting blade relative to the housing.

The clamp assembly may further have first and second grip elements that are graspable by a hand of a user and movable relative to each other to move the second jaw from the first relative position into the second relative position.

In one form, the grip elements are repositionable relative to each other between a gripping state and a release state. The first and second grip elements are graspable by a hand of a user and movable towards each other to change the grip elements from the release state into the gripping state. The second jaw moves from the first relative position into the second relative position as an incident of the grip elements repositioning from the release state into the gripping state.

The blocking surface may be defined by wood, rubber, plastic, or other like material.

The clamp assembly may further include a locking linkage which releasably maintains the second jaw in the second position without the user's having to grasp the grip elements.

The locking linkage may be engaged to maintain the second jaw in the second position as an incident of the grip elements being repositioned from the release state into the gripping state.

The locking linkage may have a plurality of links which, with the locking linkage engaged, assume an over center position to thereby maintain the second jaw in the second relative position.

The blocking surface may be defined by a squared piece of material having a length and a cross-sectional area taken transversely to the length.

In one form, the cross-sectional area of the squared piece of material is at least four inches.

The length of the squared piece of material may be at least four inches.

The first and second jaws may each have a "C" shape.

One of the first and second jaws may have an elongate strap, with there being a piece of material attached to the strap to define the blocking surface.

The invention is also directed to a method of working on a lawn mower blade that is mounted on a housing for rotation in a predetermined path. The method includes the steps of providing a clamp assembly having a first jaw with a first surface and a second jaw with a second surface, with the second jaw being movable by guided movement relative to the first jaw between a) a first relative position wherein the first and second surfaces are spaced from each other a first distance and b) a second relative position wherein the first and second surfaces are spaced from each other a second distance that is less than the first distance. The method may further include the step of placing a part of the housing between the first and second jaws with the second jaw in the first relative position and thereafter placing the second jaw in the second relative position so that the first and second jaws captively, grippingly engage the part of the housing to maintain the clamp assembly in an operative position on the housing, wherein the clamp assembly resides in the predetermined path of the cutting blade. The method may further include the step of performing an operation on the cutting blade with the clamp assembly in the operative position.

A shaft may be journalled for rotation in the housing to support the cutting blade. In one form, the step of performing an operation on the cutting blade involves at least one of a) tightening a fastener to secure the blade on the shaft, b) loosening a fastener securing the blade on the shaft, and c) reconditioning the cutting blade.

The method may include the step of locking the first and second jaws with the second jaw in the second relative position.

In one form, the clamp assembly has first and second grip elements that can be grasped by a hand of a user and repositioned relative to each other between a gripping state and a release state. The step of placing the second jaw in the second relative position may involve the step of moving the first and second grips from the release state into the gripping state to thereby cause the second jaw to move from the first relative position into the second relative position.

DETAILED DESCRIPTION OF THE DRAWINGS

Figure 1:
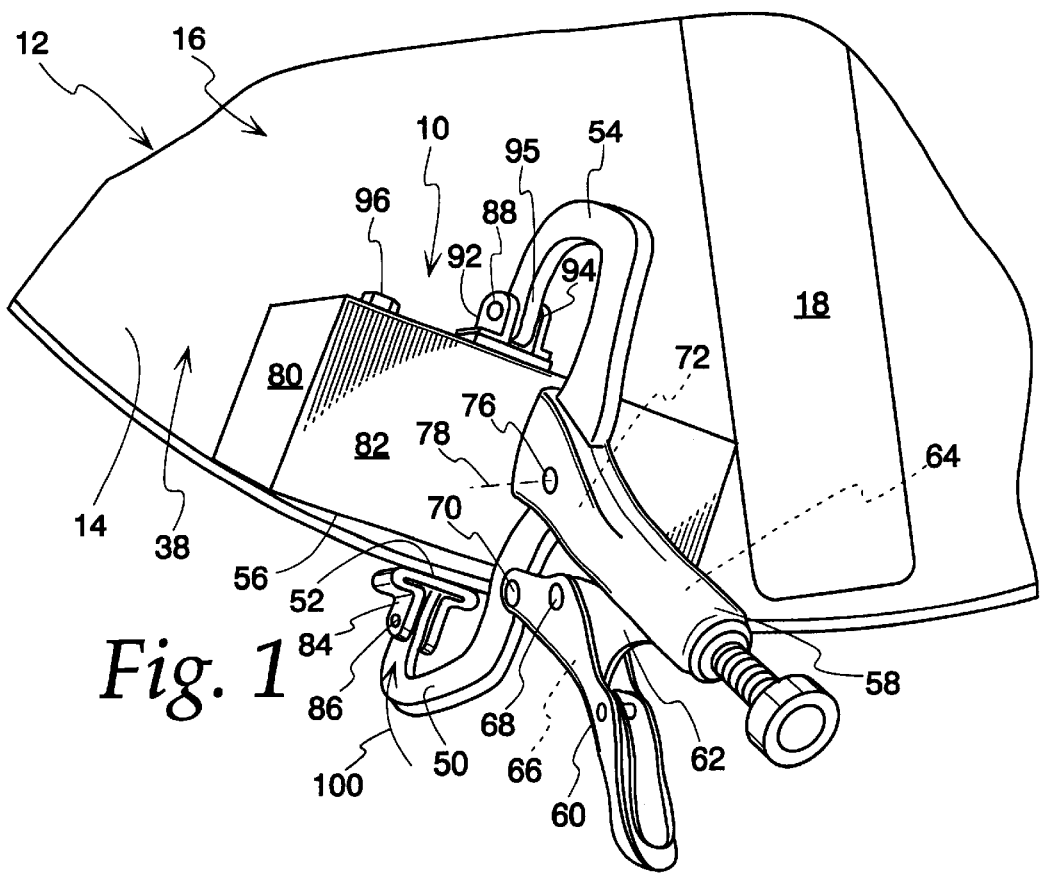
FIG. 1 is a fragmentary, perspective view of a mower deck/housing with a clamp assembly, according to the present invention in an operative position thereon and with a cutting blade on the mower deck/housing abutted to the clamp assembly.

In the drawings, a clamp assembly, according to the present invention, is shown at 10 for use in conjunction with a lawn mower assembly at 12.

The lawn mower assembly 12 is conventional in construction and consists of a mower deck/housing 14 defining a cutting chamber 16 within which at least one, and in this case three, cutting blades 18 are mounted for rotation around parallel, vertical axes 20, 22, 24.

The exemplary blade 18, which is rotatable around the axis 22, is mounted to a shaft 26 which is journalled for rotation in the housing 14 for rotation around the axis 22. A mounting fitting 28 is keyed to the shaft 26 to rotate therewith and is mounted conventionally so as not to be movable axially relative to the housing 14 with the associated blade 18 secured. The blade 18 is secured to the shaft 26 and/or fitting 28 by a bolt 30 which projects through a locking washer 32 and blade 18 and into the fitting 28. The bolt 30 is threaded so that it is tightened and loosened by rotation selectively in opposite directions around the axis 22.

In the configuration shown, the housing 14 has subchambers 34, 36, 38, each to accommodate one of the three separate blades 18. Each subchamber 34, 36, 38 is defined by an arcuate housing portion 40, 42, 44, consecutively.

The housing 14 is supported on a subjacent surface by in this case four wheels 46 (two shown) and a cylindrical roller 48, all of which are rotatable around horizontally extending axes.

The precise configuration of the mower/housing 14 is not critical to the present invention. For the clamp assembly 10 of the present invention to operate, it is only necessary to provide a single cutting blade 18 which is rotated in a predetermined path within a chamber/subchamber bounded by a peripheral wall that is within reasonably close proximity to the path of the cutting blade 18.

The operation of the clamp assembly 10 will be described below with respect to the blade 18 operating in the exemplary subchamber 38. First, the basic construction of the clamp assembly 10 will be described.

The clamp assembly 10 consists of a first C-shaped jaw 50 having a first housing engaging surface 52 thereon and a second C-shaped jaw 54 with a second housing engaging surface 56 thereon.

The operating mechanism for the jaws 50, 54 is conventional, as shown for example, in U.S. Pat. No. 4,238,123 (Bards), which is incorporated herein by reference. It suffices to say that the mechanism for operating the jaws 50, 54 includes first and second grip elements 58, 60, respectively, which are graspable by a hand of a user and movable between a release state, shown in FIG. 4, and a gripping state, shown in FIGS. 1–3. The jaws 50, 54, grip elements 58, 60, and a link element 62 connecting between the grip elements 58, 60, cooperatively define an operating linkage. One end 64 of the link element 62 is slidable guidingly relative to the grip element 58. The opposite end 66 is pivotably connected through a pin 68 to the grip element 60, which is in turn pivotably connected to the jaw 50 through a separate pin 70. In this design, the jaw 54 is fixed relative to the grip element 58 with the jaw 50 having a portion 72 that is pivotably connected to the jaw 54 and/or grip element 58 through a pin 76 for pivoting movement relative to the jaw 54 around an axis 78.

Figure 2:
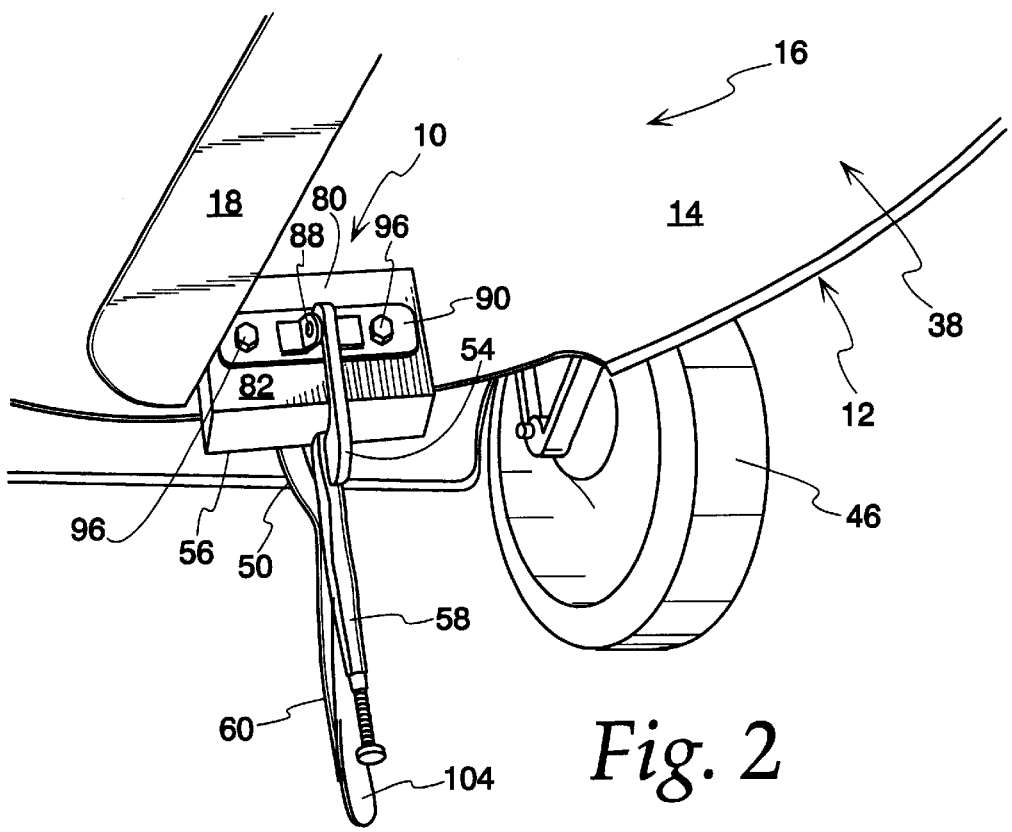
FIG. 2 is a fragmentary view of the mower deck/housing and clamp assembly in FIG. 1 taken from a different perspective.
Figure 3:
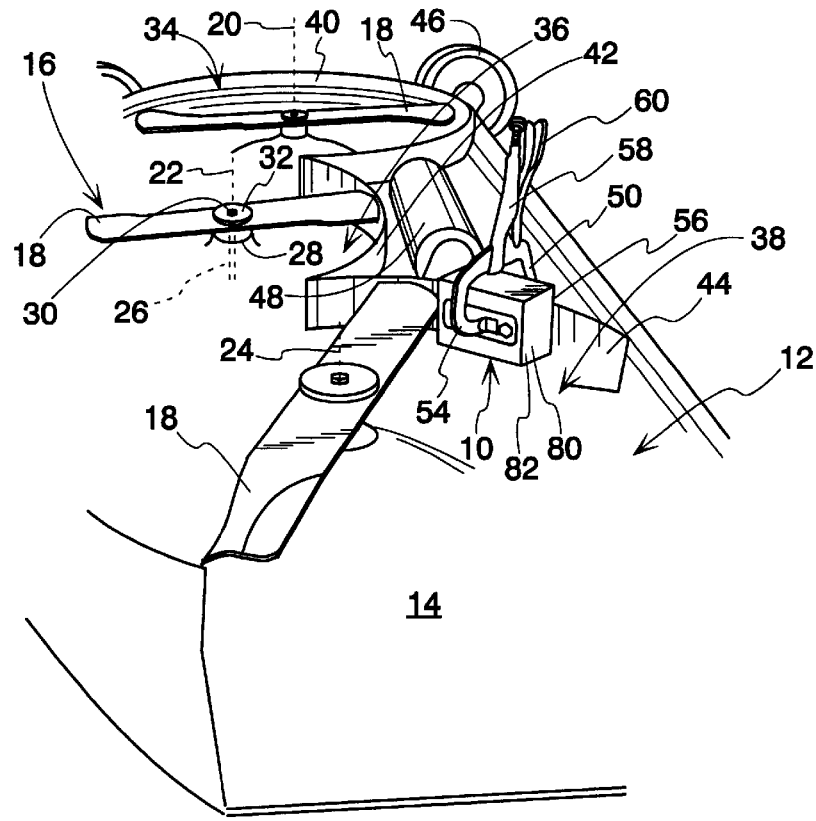
FIG. 3 is a fragmentary view of the mower deck/housing and clamp assembly as in FIGS. 1 and 2 taken from still another perspective.
Figure 4:
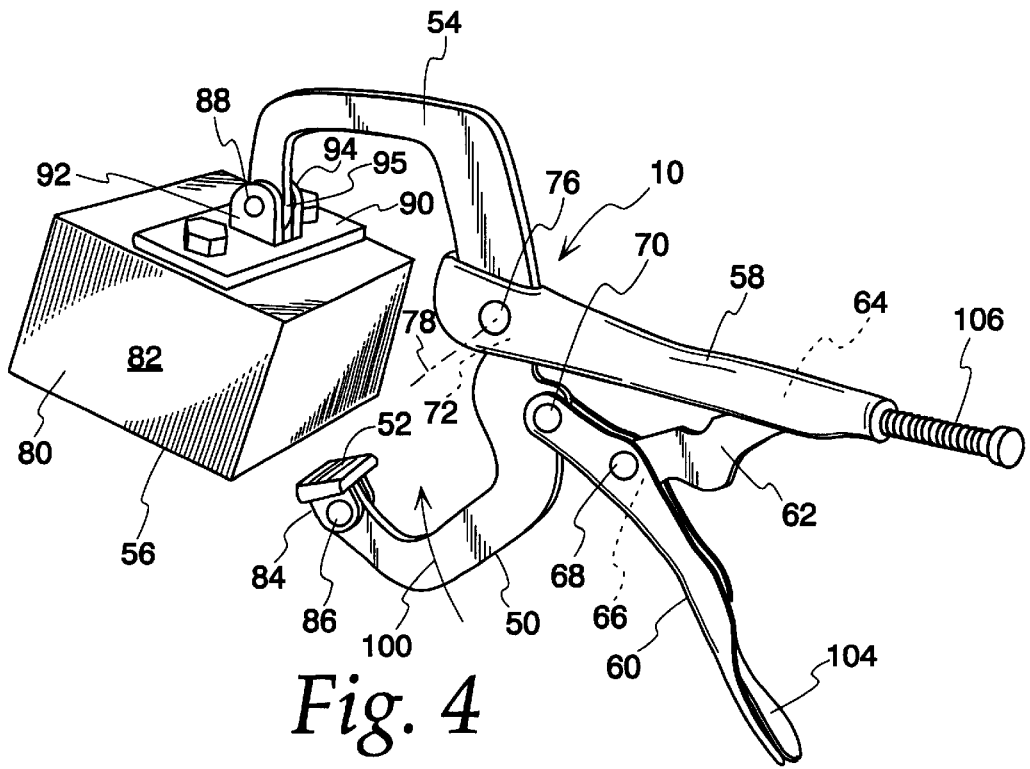
FIG. 4 is an enlarged, perspective view of the clamp assembly reconfigured from the state shown in FIGS. 1–3 to allow placement of the clamp assembly into the operative position and removal of the clamp assembly from the operative position.

With the above described arrangement, movement of the grip elements 58, 60 towards each other, as may be effected by grasping the grip elements 58, 60 in one hand and effecting a squeezing action, causes the jaws 50, 54 to be moved from the release state into the gripping state. In the release state as shown in FIG. 4, the jaw 50 is in a first relative position wherein the housing engaging surfaces 52, 56 are spaced from each other a first distance. Movement of the jaw 50 through the grip elements 58, 60 to a second relative position, as shown in FIGS. 1–3, results in the surfaces 52, 56 being spaced from each other a second distance that is less than the first distance.

With the clamp assembly 10, as described above, an exposed peripheral surface 80 on the blocking element 82 that is part of the jaw 54, can be held in place so that it resides in the path of the cutting blade 18. The clamp assembly 10 is installed at a location that is circumferentially spaced from the cutting blade 18 relative to the blade axis. The blade 18 is pivotable relative to the clamp assembly 10 but is abuttable to the clamp assembly 10 so that it is thereby prohibited from making a full revolution.

Figure 5:
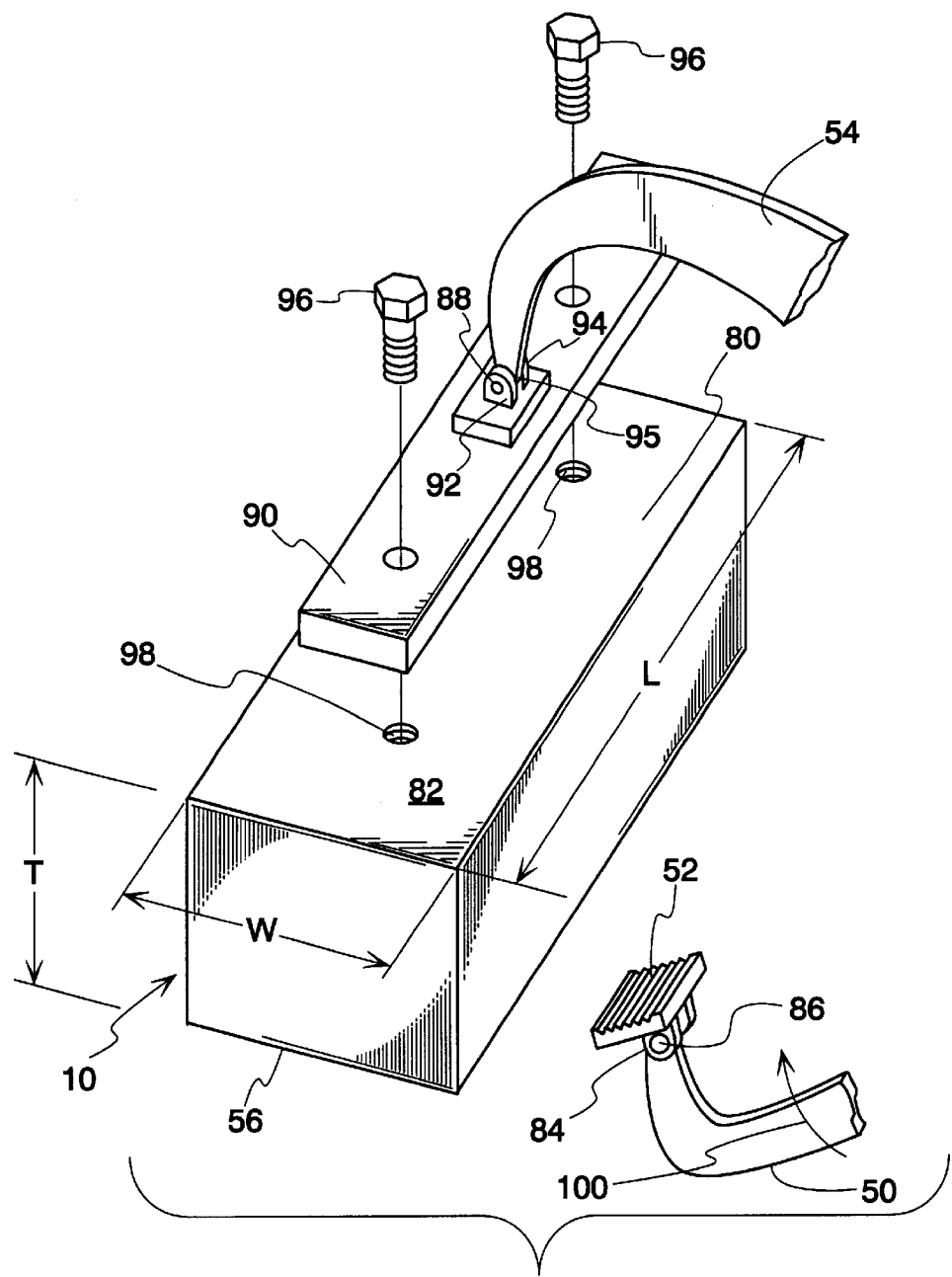
FIG. 5 is an enlarged, exploded, fragmentary, perspective view of a part of the clamp assembly in FIGS. 1–4.

The blocking element 82 can be differently dimensioned depending upon the particular configuration of the housing 14 and the relationship of the housing 14 with the cutting blade 18. Typically, a length dimension L (FIG. 5) of the blocking element 82 would be on the order of at least four inches with the width dimension W (FIG. 5) being on the order of at least three inches. A typical thickness T may be on the order of two inches. The cross-sectional area (W×T) is preferably at least four inches. The squared configuration for the blocking element 82 is desirable but not necessary.

The blocking element 82 may be made from wood, rubber, plastic, or other suitable material. Recycled plastic could be used. It is desirable that the blade 18 be allowed to "dig in" to the material of the blocking element 82 so that the blade 18 is positively held without being damaged.

It is also desirable that a wall on the housing 14 be firmly held captively between the surfaces 52, 56. To facilitate this, the surface 52 is formed on an end fitting 84 which is pivotably connected through a pin 86 to the jaw 50.

The blocking element 82 is connected to the jaw 54 through a pin 88 which likewise facilitates pivoting of the blocking element 82 relative to the jaw 54. An elongate strap 90 with spaced ears 92, 94 receives the free end 95 of the jaw 54. The pin 88 extends through the ears 92, 94 and the free jaw end 95 therebetween. The strap 90 is secured by bolts 96 to the blocking element 82. Pre-threaded blind or through bores 98 may be formed in the blocking element 82 to accept the bolts 96.

With the above described arrangement, the planes of the surfaces 52, 56 can angularly reorient relative to each other as the spacing therebetween is varied to assure the most positive gripping action on the housing 14.

Figure 6:
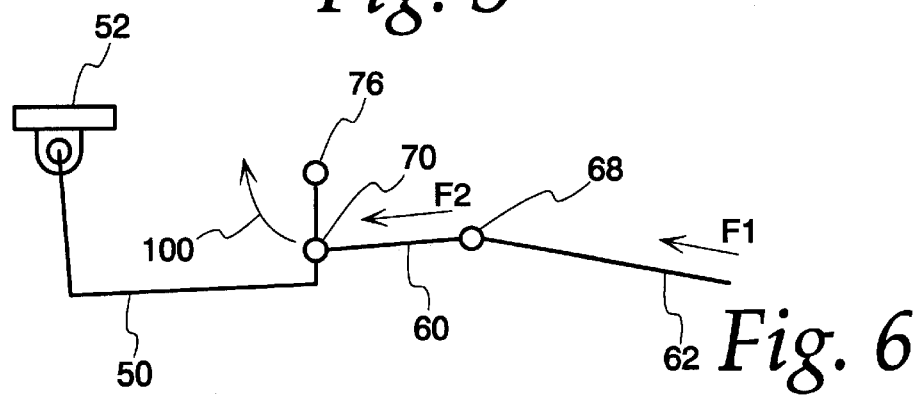
FIG. 6 is a schematic representation of links on the clamp assembly of FIGS. 1–5 with the links shown in over center position to lock the clamp assembly in the operative position shown in FIGS. 1–3.

To use the clamp assembly 10, the clamp assembly 10 is initially placed in the FIG. 4 state. The clamp assembly 10 is situated relative to the housing 14 so that a desired housing portion 40,42,44 bounding the particular subchamber 34, 36, 38, in which a blade 18 to be operated upon is situated, is straddled by the surfaces 52, 56, with the blocking element 82 residing within the particular subchamber 34, 36, 38. By then squeezing the grip elements 58, 60, the surfaces 52, 56 are caused to captively grip the housing portion 40, 42, 44. Continued force application on the grip elements 58, 60 causes the application of additional pressure between the surfaces 52, 56 and also results in the over center situation of the link element 62 so that the elements 58, 60, 62 and jaw 50 cooperatively define an over center locking linkage. That is, as shown in FIG. 6, the link element 62, grip element 50, and jaw 50 assume a position so that the line of a force F1 applied by the link element 62 to the pin 68 causes the grip element to exert a force F2 on the jaw 50 through the pin 70 that tends to rotate the jaw 50 in the direction of the arrow 100 around the pin 76 to produce a residual gripping force by the surface 52 on the housing portion 40, 42, 44. The clamp assembly 10 is thereby maintained positively in the operative position upon the housing 14 without the need by a user to engage the grip elements 58, 60.

In the operative position, the blocking element 82 prevents the blade 18 with which the clamp assembly 10 is associated from freely rotating relative to the housing 14. The user then has the freedom to use both hands to turn the bolt 30 to mount or release the cutting blade 18 or to work on the cutting blade 18 in place, such as to effect sharpening thereof. At the completion of the desired operation, the clamp assembly 10 can be removed by first operating a release lever 104, which moves the locking linkage, consisting of the grip elements 58, 60, the link element 62, and the jaw 50, out of the over center state. A conventional, threaded, adjusting element 106 can be operated to select the spacing between the surfaces 52, 56 at which the jaws 50, 54 lock to accommodate housings 14 having different thicknesses and different wall curvatures.

The clamp assembly 10 can be readily placed in the operative position and separated from the housing. Similarly, the clamp assembly 10 lends itself to being placed in the operative position in various locations on the housing 14 so that the cutting blade 18 is stopped in the most convenient place for working on the lawn mower assembly 12.

The foregoing disclosure of specific embodiments is intended to be illustrative of the broad concepts comprehended by the invention.

What is claimed is:

1. In combination:
   a) a lawn mower assembly comprising:
   a housing defining a cutting chamber;
   a shaft journalled for rotation in the housing around an axis; and
   a cutting blade that is selectively:
   i) releasably attached to the shaft to rotate with the shaft in a predetermined path around the shaft axis, and
   ii) separable from the shaft as to facilitate reconditioning or replacement of the cutting blade; and
   b) a clamp assembly comprising:
   a first jaw having a first surface; and
   a second jaw having a second surface, the second jaw being movable relative to the first jaw between
   i) a first relative position wherein the first and second surfaces are spaced from each other a first distance, and
   ii) a second relative position wherein the first and second surfaces are spaced from each other a second distance that is less than the first distance,
   the second jaw being movable relative to the first jaw between the first and second relative positions by guided pivoting movement of the second jaw relative to the first jaw,
   one of the first and second jaws having a blocking surface thereon,
   whereby the clamp assembly can be situated in an operative position on the lawn mower assembly wherein the second jaw in the second relative position, the first and second jaws captively, grippingly engage the housing and the blocking surface resides in the predetermined path of the cutting blade to thereby prevent free rotation of the cutting blade relative to the housing.

2. The combination according to claim 1 wherein the clamp assembly comprises first and second grip elements that are graspable by a hand of a user and movable by a squeezing action relative to each other to move the second jaw from the first relative position into the second relative position.

3. The combination according to claim 2 wherein the grip elements are repositionable relative to each other between a gripping state and a release state, the first and second grip elements are simultaneously graspable by a single hand of a user and movable towards each other by a squeezing action to change the grip elements from the release state into the gripping state, and the second jaw moves from the first relative position into the second relative position as an incident of the grip elements repositioning from the release state into the gripping state.

4. The combination according to claim 3 wherein the blocking surface is defined by wood.

5. The combination according to claim 3 wherein the blocking surface is defined by at least one of rubber and plastic.

6. The combination according to claim 3 wherein the clamp assembly further comprises a locking linkage which releasably maintains the second jaw in the second position without a user's having to grasp the grip elements.

7. The combination according to claim 6 wherein the locking linkage is engaged to maintain the second jaw in the second position as an incident of the grip elements being repositioned from the release state into the gripping state.

8. The combination according to claim 6 wherein the locking linkage comprises a plurality of links which assume an over center position with the locking linkage engaged to thereby maintain the second jaw in the second relative position.

9. The combination according to claim 1 wherein the blocking surface is defined by a squared piece of material having a length and a cross-sectional area taken transversely to the length.

10. The combination according to claim 9 wherein the cross-sectional area of the squared piece of material is at least 4 inches.

11. The combination according to claim 9 wherein the length of the squared piece of material is at least 4 inches.

12. The combination according to claim 1 wherein the first and second jaws each have a "C" shape.

13. The combination according to claim 1 wherein one of the first and second jaws comprises an elongate strap and a piece of material attached to the strap and defining the blocking surface.

14. The combination according to claim 13 wherein the piece of material is made from wood.

15. The combination according to claim 13 wherein the piece of material is made from at least one of rubber and plastic.

16. A method for working on a lawn mower cutting blade that is mounted on a housing for rotation in a predetermined path around an axis, said method comprising the steps of:
providing a clamp assembly comprising a first jaw having a first surface and a second jaw having a second surface with the second jaw being movable by guided movement relative to the first jaw between
a) a first relative position wherein the first and second surfaces are spaced from each other a first distance, and
b) a second relative position wherein the first and second surfaces are spaced from each other a second distance that is less than the first distance;
placing a part of the housing between the first and second jaws with the second jaw in the first relative position;
placing the second jaw in the second relative position so that the first and second jaws captively, grippingly engage a part of the housing to maintain the clamp assembly in an operative position on the housing with the clamp assembly circumferentially spaced from the cutting blade relative to the blade axis and residing in the predetermined path of the cutting blade; and
performing an operation on the cutting blade with the clamp assembly in the operative position.

17. The method according to claim 16 wherein there is a shaft journalled for rotation in the housing and the step of performing an operation on the cutting blade comprises at least one of a) tightening a fastener to secure the blade on the shaft, b) loosening a fastener securing the blade on the shaft and c) reconditioning the cutting blade.

18. The method according to claim 16 including the step of locking the first and second jaws with the second jaw in the second relative position.

19. The method according to claim 16 wherein the step of providing a clamp assembly comprises providing a clamp assembly with a piece of material that is at least one of wood, plastic and rubber that resides in the predetermined path of the cutting blade.

20. The method according to claim 16 wherein the clamp assembly has first and second grip elements that can be grasped by a hand of a user and repositioned relative to each other between a gripping state and a release state, and the step of placing the second jaw in the second relative position comprises the step of repositioning the first and second grip elements from the release state into the gripping state to thereby cause the second jaw to move from the first relative position into the second relative position.

* * * * *